Aug. 30, 1927.
H. COLOMB
1,640,348
PROCESS FOR MAKING CONCENTRIC BUSHINGS FOR JEWEL BEARINGS
Filed Aug. 11, 1924
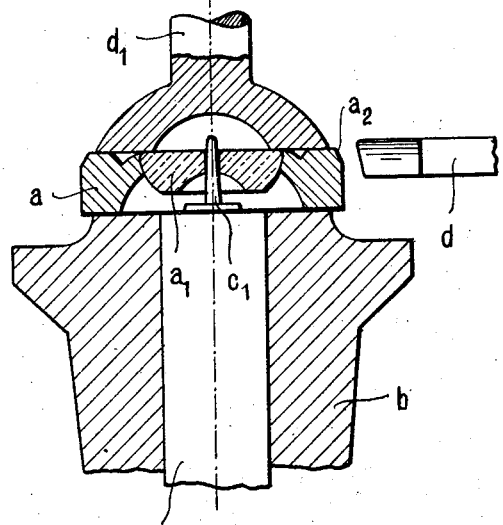
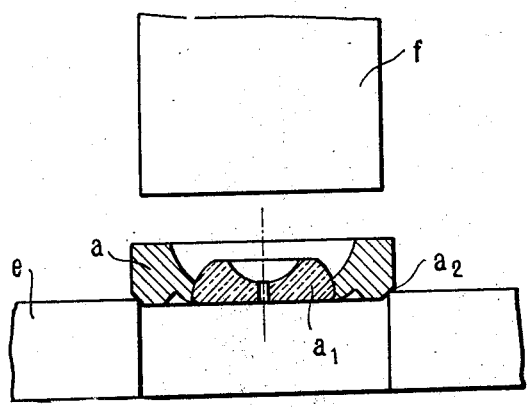
Inventor
H. Colomb Patented Aug. 30, 1927.

1,640,348

UNITED STATES PATENT OFFICE.

HENRI COLOMB, OF TAVANNES, SWITZERLAND.

PROCESS FOR MAKING CONCENTRIC BUSHINGS FOR JEWEL BEARINGS.

Application filed August 11, 1924, Serial No. 731,535, and in Switzerland January 15, 1924.

This invention is an improvement on the process for rectifying jewel bushings by a die press disclosed in my prior U. S. Patent No. 1,523,169 dated Jan. 13, 1925. The process described in said patent is successful in cases where the central perforation is fairly large so that the centering pin there shown may be sufficiently large and strong to firmly hold the bushed jewel in position until the press plunger has initially forced it into the die. I have found, however, that in cases where the perforation is of very small diameter the small centering pin then required is so slender that it may bend and permit the bushing to be forced out of line by the initial shock of the plunger, or through inexpert manipulation by the operative in setting the work. My present invention overcomes this difficulty by dispensing with the centering pin and firmly centering the bushing in the die by means of a conical surface formed on the outer surface at the end initially inserted in the die. This conical surface may be formed in any suitable way, but I have shown in the drawings the best form of apparatus at present known to me for thus preparing the bushing before its insertion in the die.

Fig. 1 is an axial section of a jewel and the bushing in which it is set;

Fig. 2 is an axial section of one form of centering mandrel and clamp for holding this bushing during the coning operation, the bushed jewel being shown in position, but other parts being partly broken away; and Fig. 3 shows the coned bushing set in a die ready for the final operation. Throughout the drawings like reference characters indicate like parts.

The bushing in Fig. 1 is designated by the letter $a$ and the drilled jewel by $a^1$.

As shown in Fig. 2 the setting is shown clamped on the mandrel $b$ of a lathe. To this end, this mandrel is provided with an exactly centered guide-pin $c$ which extends slightly beyond the end of the mandrel and ends in a conical point $c^1$. The axis of this pin coincides exactly with the axis of the mandrel. The setting with its stone being stuck on this point is pressed against the mandrel by means of a fork $d^1$. $d$ designates a cutting tool shaped so as to cut at one side of the setting a slightly conical border $a^2$. The centering pin may be withdrawn from the hole of the stone as soon as the fork presses against the setting.

Fig. 3 shows the final pressing operation. $e$ is the matrix or die and $f$ the punch. The setting $a$ is centered within the matrix by its cone portion $a^2$, the internal diameter of said matrix or die being less than the largest diameter of the conical border $a^2$ and larger than the smallest diameter. When the punch moves it pushes the setting through the matrix and the outside of the bushing originally extending above the mouth of the die is exactly rectified with regard to the hole of the jewel, being given a cylindrical surface concentric therewith.

The length of the conical border $a^2$ is somewhat exaggerated in Figs. 2 and 3. The real length is very small and the taper very slight. This cone requires therefore very little work in its formation and but little work has to be done by the die in the final rectifying operation.

It is evident, that instead of a cutting tool $d$ there could also be employed a milling—or a grinding tool for the cone-forming step, and other clamping mechanism could be employed. The guide point $c'$ could also be dispensed with. The centering of the jewel would in this case be otherwise initially effected in the setting on the mandrel. The conical border could also be produced otherwise than by a lathe.

Having now fully described and ascertained the nature of my invention and the manner in which the same is to be performed that what I claim as new and want to secure by Letters Patent is:—

The herein-described process of forming a bushed jewel journal bearing which shall have an outer circumferential wall exactly concentric with the central perforation in the jewel, which process comprises the following steps: turning a short coned outer surface on one end of said bushing, the axis of which coned surface coincides exactly with the axis of said perforation; introducing such coned surface of said bushing into a circular die, the inner diameter of which is greater than the least diameter of said coned surface but less than its greatest diameter; and, finally, forcing said bushing completely into said die, whereby a shaving is removed from the originally protruding portion thereof which reduces it to a cylindrical form having the exact diameter of said die opening.

In testimony whereof I affix my signature.

HENRI COLOMB.